United States Patent
Peshkovsky

(10) Patent No.: US 11,325,094 B2
(45) Date of Patent: May 10, 2022

(54) ULTRASONIC HORN WITH A LARGE HIGH-AMPLITUDE OUTPUT SURFACE

(71) Applicant: Industrial Sonomechanics, LLC, New York, NY (US)

(72) Inventor: Alexey S. Peshkovsky, New York, NY (US)

(73) Assignee: Industrial Sonomechanics, LLC, New York, NY (US)

(*) Notice: Subject to any disclaimer, the term of this patent is extended or adjusted under 35 U.S.C. 154(b) by 19 days.

(21) Appl. No.: 16/667,411

(22) Filed: Oct. 29, 2019

(65) Prior Publication Data
US 2020/0129953 A1  Apr. 30, 2020

Related U.S. Application Data

(60) Provisional application No. 62/752,046, filed on Oct. 29, 2018.

(51) Int. Cl.
*B01J 19/10* (2006.01)
(52) U.S. Cl.
CPC ........ *B01J 19/10* (2013.01); *B01J 2219/0877* (2013.01)
(58) Field of Classification Search
CPC ............................ B01J 19/10; B01J 2219/0877
See application file for complete search history.

(56) References Cited

U.S. PATENT DOCUMENTS

| 4,131,505 | A | † | 12/1978 | Davis, Jr. | |
| 5,179,923 | A | † | 1/1993 | Tsurutani | |
| 7,156,201 | B2 | * | 1/2007 | Peshkovskiy | B06B 3/00 181/175 |
| 8,651,230 | B2 | † | 2/2014 | Peshkovsky | |
| 2010/0193349 | A1 | † | 8/2010 | Braam | |

FOREIGN PATENT DOCUMENTS

DE            29911535 U1 †  11/1999

\* cited by examiner
† cited by third party

*Primary Examiner* — Timothy C Cleveland
(74) *Attorney, Agent, or Firm* — Bond Schoeneck and King PLLC; David Nocilly

(57) ABSTRACT

Ultrasonic horns having improved longevity and simplified manufacturing approaches that can be more easily adapted to ultrasonic reactor chambers or batch processing containers. The ultrasonic horn designs increase the uniformity and intensity of acoustic energy radiated into a liquid medium and thus better correspond to the requirements of a particular sonochemical or sonomechanical process. The ultrasonic horns do not require a specific number of cylindrical sections and allow for various lengths and profiles of variable-diameter sections. The ultrasonic horns also reduce stress in the material of the ultrasonic horns and therefore extend longevity.

4 Claims, 8 Drawing Sheets

//ULTRASONIC HORN WITH A LARGE HIGH-AMPLITUDE OUTPUT SURFACE

CROSS-REFERENCE TO RELATED APPLICATION

The present application claims priority to U.S. Provisional Application No. 62/752,046, filed on Oct. 29, 2018.

BACKGROUND OF THE INVENTION

1. Field of the Invention

The present invention relates to the field of ultrasonic liquid processing equipment and, more specifically, devices for the transmission of ultrasonic energy into liquid media.

2. Description of the Related Art

Advantages of using ultrasonically induced acoustic cavitation for liquid processing are well-known and described, for example, in: K. S. Suslick, Sonochemistry, Science 247, pp. 1439-1445 (1990); T. J. Mason, Practical Sonochemistry, A User's Guide to Applications in Chemistry and Chemical Engineering, Ellis Norwood Publishers, West Sussex, England (1991), hereby incorporated by reference.

In ultrasonic systems designed for industrial liquid processing, the liquid subjected to ultrasonic cavitation treatment is placed in a fixed-volume container (batch processing) or flows through a reactor chamber (flow-through processing). In both cases, the liquid is in contact with an ultrasonic horn (also known as probe, waveguide radiator and sonotrode), which is connected to an electro-acoustical transducer and used to amplify the transducer's vibration amplitude and deliver the ultrasonic energy to the liquid. Such ultrasonic systems are described, for example, in U.S. Pat. Nos. 7,156,201, 7,157,058, 8,651,230 and International Application No.: PCT/US2008/068697, hereby incorporated by reference.

Typically, ultrasonic horns have cylindrical shapes with at least one section of variable cross-section that reduces the overall diameter of the horn from the input surface to the output surface, referred to as a converging horn. While converging horns may have high gain factors (and, therefore, can significantly increase vibration amplitudes), their high-amplitude output tip diameters and the related output surface areas are too small to deposit sufficient amounts of acoustic energy into liquids to allow for industrial-scale processing. These devices are, therefore, limited to laboratory-scale processing only. As further explained in U.S. Pat. No. 8,651,230, hereby incorporated by reference, only the horns that provide high output vibration amplitudes (have high gain factors) and at the same time have large high-amplitude tip diameters (large output surface areas) are appropriate for the use in industrial-scale ultrasonic liquid processing.

A full-wave horn design described in U.S. Pat. No. 7,156,201, hereby incorporated by reference, is able to provide high output vibration amplitudes and large output surface areas simultaneously, thereby circumventing the abovementioned drawbacks of converging horns. This device is, however, still subject to the following limitations: 1) at least three cylindrical sections interconnected by at least two sections of variable cross-section (hereinafter individually referred to as "variable-diameter section") must be present, 2) only conical-profile variable-diameter sections are possible, 3) the length of any variable-diameter section must be equal or greater than $Log(N)/k$, where $k=\omega/C$ is the wave number for the variable-diameter (transitional) section, N is the ratio of the diameters of the cylindrical sections that are adjacent to the variable-diameter section, w is the angular vibration frequency, C is the sound velocity in the horn material (with phase velocity dispersion taken into account), and 4) the sum of the length of the second cylindrical section and the length of the variable-diameter section adjacent to said second cylindrical section is at least 30% of the total length. These restrictions were thought to be necessary to decrease the dynamical stress and thus to increase the operational life of the device.

A half-wave ultrasonic horn design described in U.S. Pat. No. 8,651,230, hereby incorporated by reference, is also able to provide high output vibration amplitudes and large output surface areas simultaneously, thereby circumventing the abovementioned drawbacks of converging horns. In addition, it circumvents some of the limitations of the full-wave ultrasonic horn design described in U.S. Pat. No. 7,156,201. While still requiring two variable-diameter sections connecting three other sections, it only specifies that two of said three other sections are cylindrical and that the first variable-diameter section can have any profile and be shorter than $\ln(N)/k$, where N is the ratio of the diameters of the first and second cylindrical sections, respectively, and k is the wave number representing the angular frequency of ultrasonic vibrations divided by the speed of sound in the horn material (with phase velocity dispersion taken into account). This provides greater flexibility for designing ultrasonic horns with high output vibration amplitudes and large output surface areas, but still requires interconnecting cylindrical and variable-diameter sections, which elevates stress and reduces the longevity of these devices. In addition, the requirement for a certain number, types and interconnection sequence of sections complicates the manufacturing of these devices and restricts the designer's ability to adapt their overall shapes to the requirements of a particular sonochemical or sonomechanical process.

Therefore, to be able to maximize the effect of the ultrasonic cavitation treatment on a liquid medium load, a well-defined need exists to develop improved ultrasonic horn designs, free from the abovementioned limitations, including the requirement for a specific number of cylindrical sections, restrictions related to the lengths of variable-diameter sections, and restrictions related to the profiles of variable-diameter sections. Without these limitations, the overall shapes of ultrasonic horns can be better adapted to the requirements of a particular sonochemical or sonomechanical process, their longevity can be increased and their manufacturing can be simplified.

BRIEF SUMMARY OF THE INVENTION

It is therefore a principal object and advantage of the present invention to provide a high-capacity ultrasonic processor that increases the total amount of acoustic energy radiated into a liquid medium by the ultrasonic processor.

It is an additional object and advantage of the present invention to provide a high-capacity ultrasonic processor that increases the available output radiation surface and the uniformity of the distribution of acoustic energy throughout the volume of the ultrasonic processor.

It is a further object and advantage of the present invention to provide a high-capacity ultrasonic processor that increases the intensity of acoustic energy radiated into a liquid medium by the ultrasonic processor.

It is another object and advantage of the present invention to provide a high-capacity ultrasonic processor that maximizes the transfer efficiency of the ultrasonic generator's electric energy into the acoustic energy radiated into a liquid medium by the ultrasonic processor.

It is an additional object and advantage of the present invention to provide a high-capacity ultrasonic processor that improves the quality of operation and to increase the operational lifespan of the ultrasonic horn incorporated in the ultrasonic processor.

It is a further object and advantage of the present invention to provide a high-capacity ultrasonic processor that maximizes the production capacity of the ultrasonic processor.

In accordance with the foregoing objects and advantages, the present invention provides several novel designs of ultrasonic horns with improved longevity and simplified manufacturing. Furthermore, the use of these novel designs provides greater flexibility to adapt the shapes of ultrasonic horns to ultrasonic reactor chambers or batch processing containers, thereby increasing the uniformity and intensity of acoustic energy radiated into the liquid medium by an ultrasonic processor and allowing the horns to better correspond to the requirements of a particular sonochemical or sonomechanical process. The advantages of these designs are achieved by circumventing the requirement for a specific number of cylindrical sections, restrictions related to the lengths of variable-diameter sections and restrictions related to the profiles of variable-diameter sections. Additionally, because circumventing the aforementioned limitations makes it possible to extend the lengths of variable-diameter sections and adjust their profiles (shapes) with greater flexibility, the present invention allows for the reduction of stress in the material of ultrasonic horns and, therefore, significantly extends their longevity.

Unless specified otherwise, all variable-diameter sections in the below embodiments may be shorter, equal to or longer than Ln(N)/k (as defined above) and may have any profile, such as conical, exponential, catenoidal, stepped, circular, or any other, as well as any profile that is a combination of other profiles.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
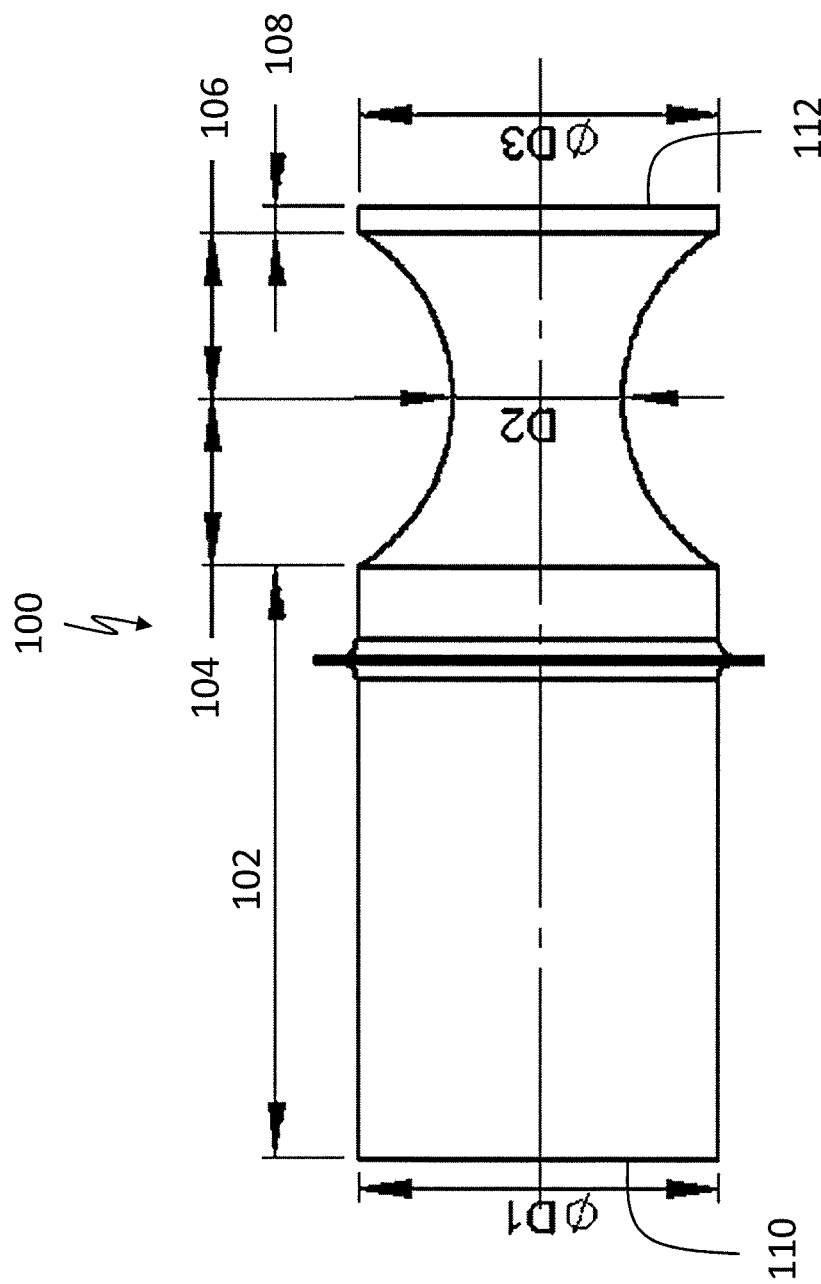
FIG. 1 is a schematic of an ultrasonic horn with reducing and expanding diameter sections without any intermediate cylindrical section according to one embodiment of the present invention.
Figure 2:
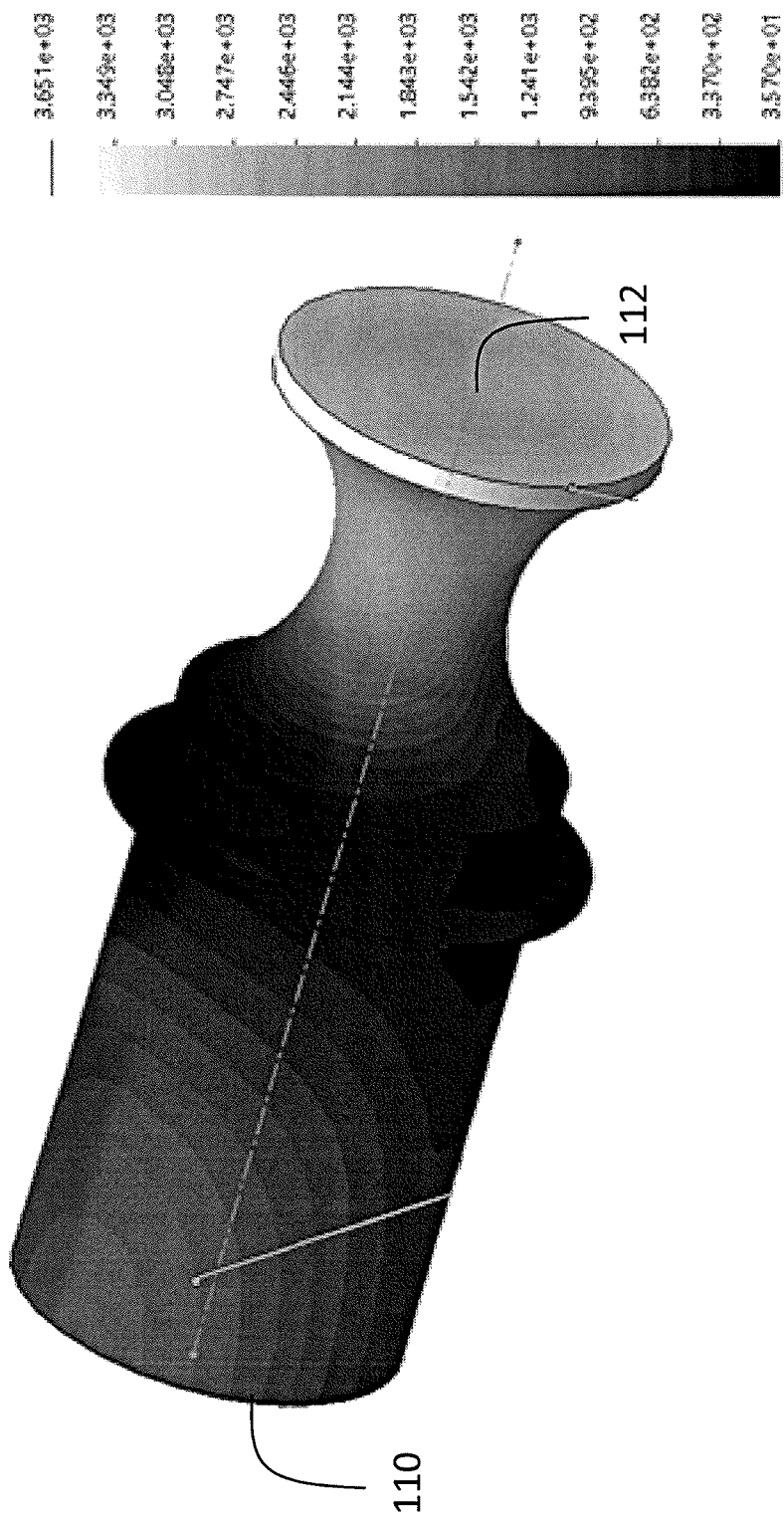
FIG. 2 is a model of the sonic amplitudes of the ultrasonic horn of FIG. 1.

Referring to the figures, wherein like numeral refer to like parts throughout, there is seen in FIG. 1 a first embodiment of an ultrasonic horn 100 which comprises an entrance cylindrical section 102 having a first diameter D1, connected to a first variable-diameter section 104 with a diminishing diameter to a second diameter D2 (hereinafter referred to as "reducing-diameter section"), connected to a second variable-diameter section 106 with an increasing diameter (hereinafter referred to as "increasing-diameter section") to diameter D3, connected to an exit cylindrical section 108. FIG. 2 shows the ultrasonic amplitudes for horn 100 in arbitrary units and demonstrates a high gain at the output surface 112 of horn 100. In this embodiment, entrance cylindrical section 102 provides the input surface 110 for ultrasonic energy from a transducer, and cylindrical section 108 provides the main output surface 112 from which the energy is transmitted to a fluid in which the output surface is submerged.

Figure 3:
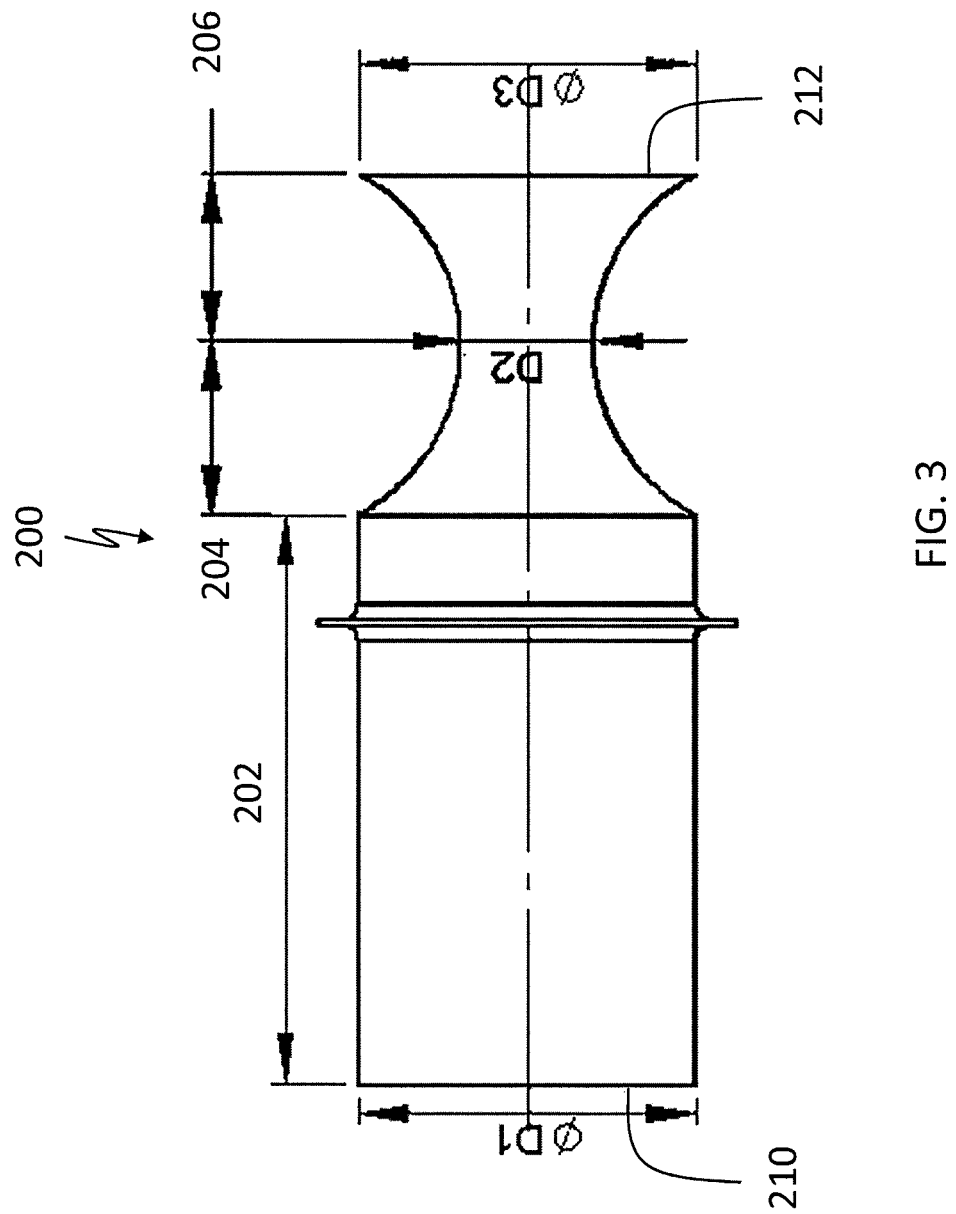
FIG. 3 is a schematic of an ultrasonic horn without any intermediate cylindrical section and any exit cylindrical section according to another embodiment of the present invention.
Figure 4:
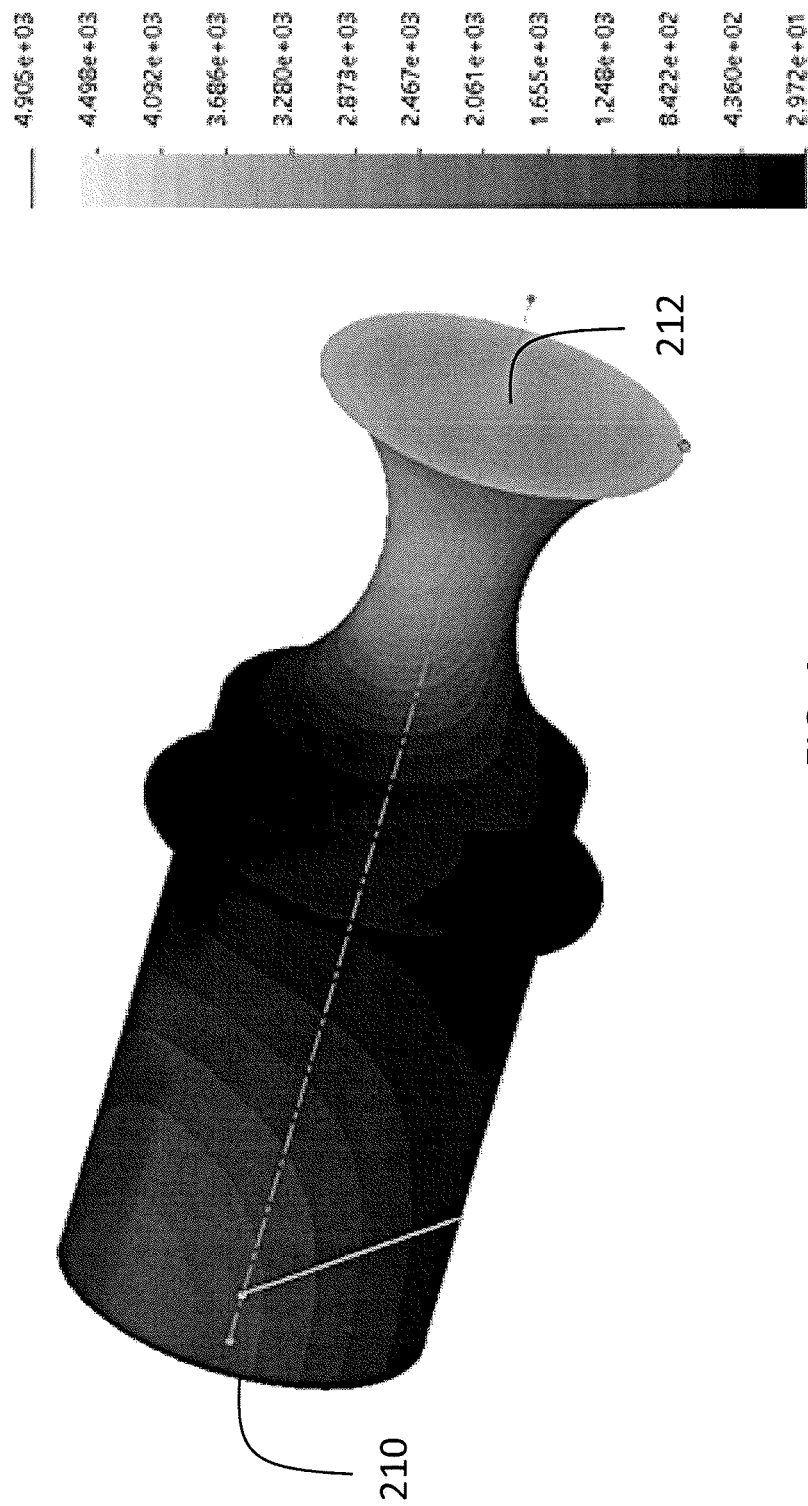
FIG. 4 is a model of the sonic amplitudes of the ultrasonic horn of FIG. 3.

There is seen in FIG. 3 a second embodiment of an ultrasonic horn 200 which comprises an entrance cylindrical section 202 having diameter D1, connected to a reducing-diameter section 204 to a second diameter D2, connected to an increasing-diameter section 206 to diameter D3. FIG. 4 shows the ultrasonic amplitudes for horn 200 in arbitrary units and demonstrates a high gain at the output surface of horn 200. In this embodiment, entrance cylindrical section 202 provides the input surface 210 for ultrasonic energy from a transducer, and increasing-diameter section 206 provides the main output surface 212 from which the energy is transmitted to a fluid in which the output surface is submerged.

Figure 5:
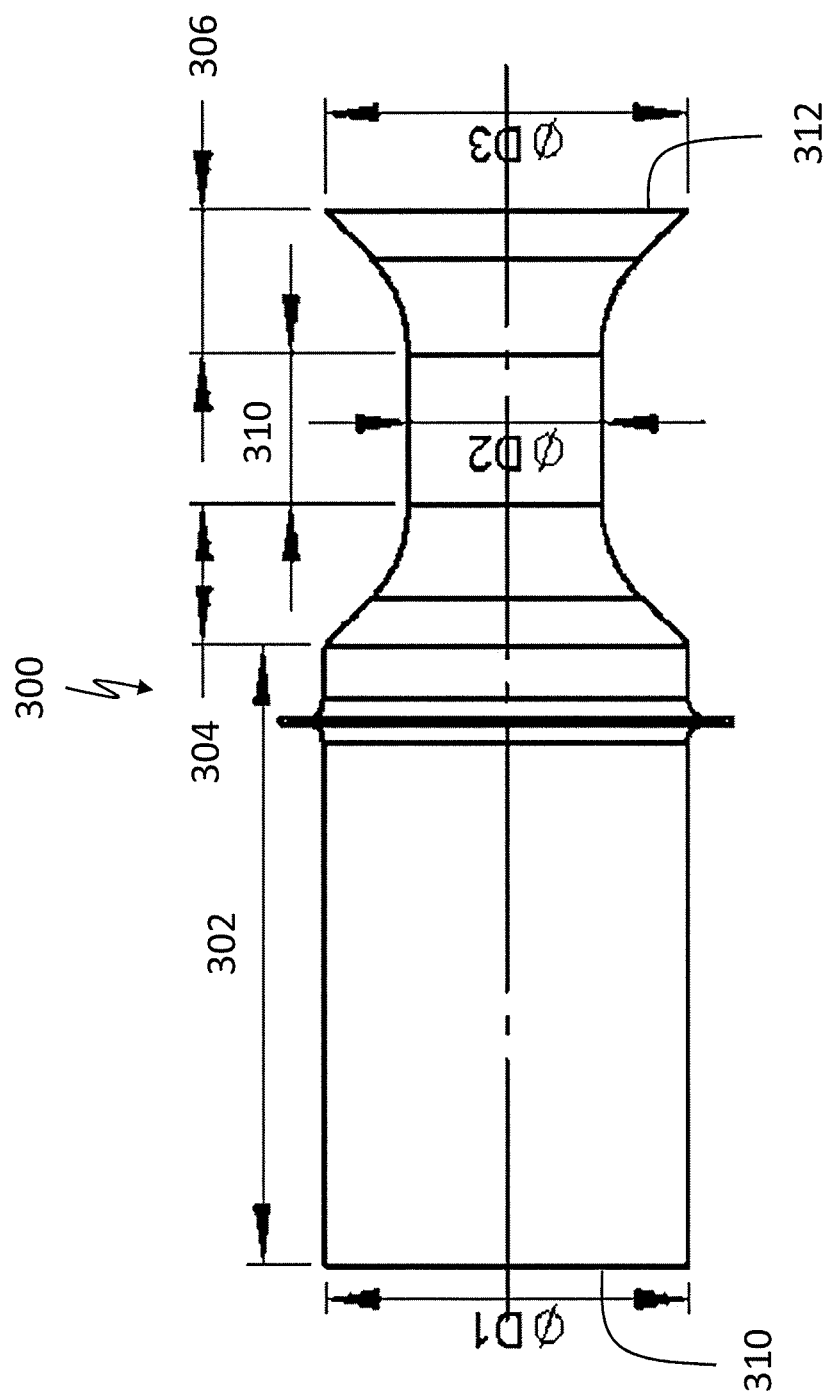
FIG. 5 is a schematic of an ultrasonic horn without any exit cylindrical section according to another embodiment of the present invention.
Figure 6:
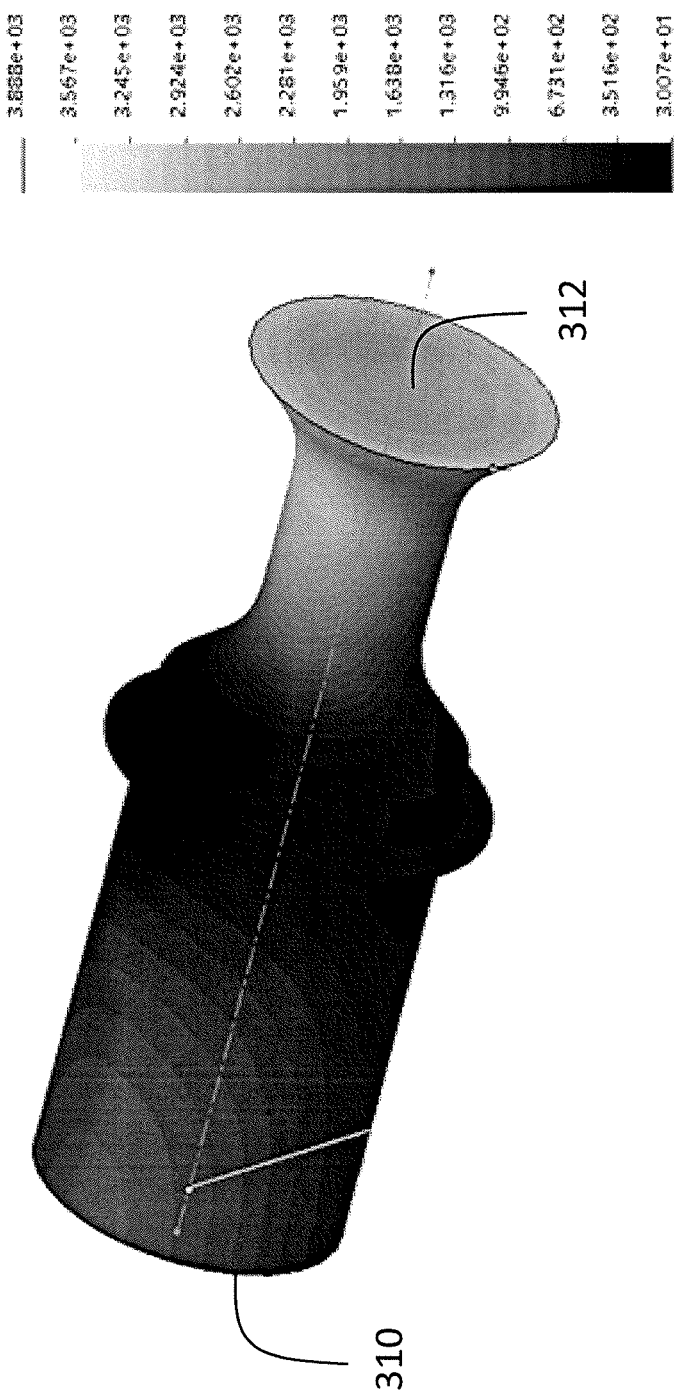
FIG. 6 is a model of the sonic amplitudes of the ultrasonic horn of FIG. 5.

There is seen in FIG. 5 a third embodiment of an ultrasonic horn 300 which comprises an entrance cylindrical section 302 of diameter D1, connected to a reducing-diameter section 304 to diameter D2, connected to a thinner intermediate cylindrical section 310 of diameter D2, connected to an increasing-diameter section 306 to diameter D3. FIG. 6 shows the ultrasonic amplitudes for horn 300 in arbitrary units and demonstrates a high gain at the output surface of horn 300. In this embodiment, entrance cylindrical section 302 provides the input surface 310 for ultrasonic energy from a transducer, and increasing-diameter section 306 provides the main output surface 312 from which the energy is transmitted to a fluid in which the output surface is submerged.

Ultrasonic horn 100, horn 200, or horn 300 of the present invention may be manufactured from the same materials as existing ultrasonic horns, such as titanium alloys and other metals.

Figure 7:
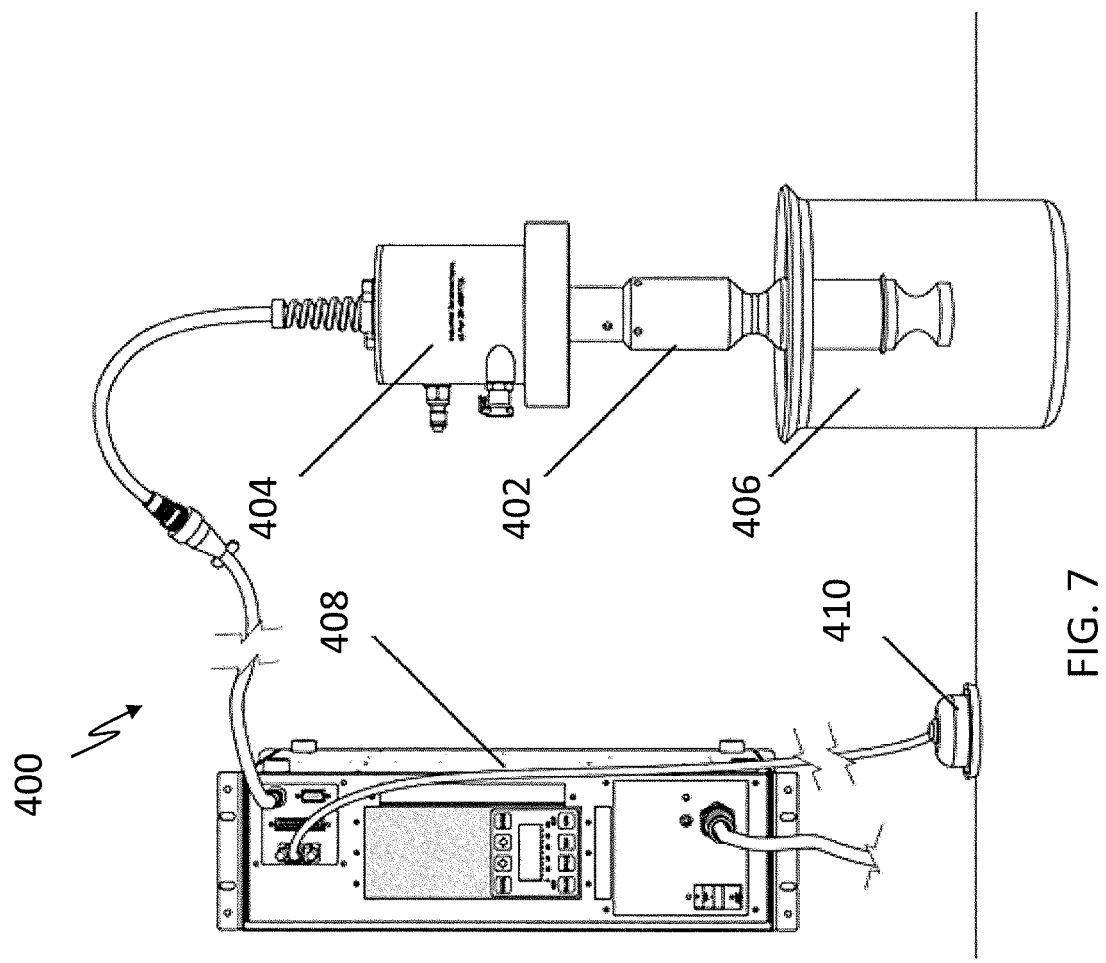
FIG. 7 is a schematic of an ultrasonic horn in combination with a batch container according to the present invention.

There is seen in FIG. 7, a batch system 400 having an ultrasonic horn 402 (which may be any of horn 100, horn 200, or horn 300 of the present invention) coupled to a transducer 404. The output surface of horn 402 is positioned in a batch container 406 having a fixed-volume that holds a working liquid to be processed using ultrasonic horn 402. A generator 408 is used to drive transducer 404 in response to user activation via a remote switch 410.

Figure 8:
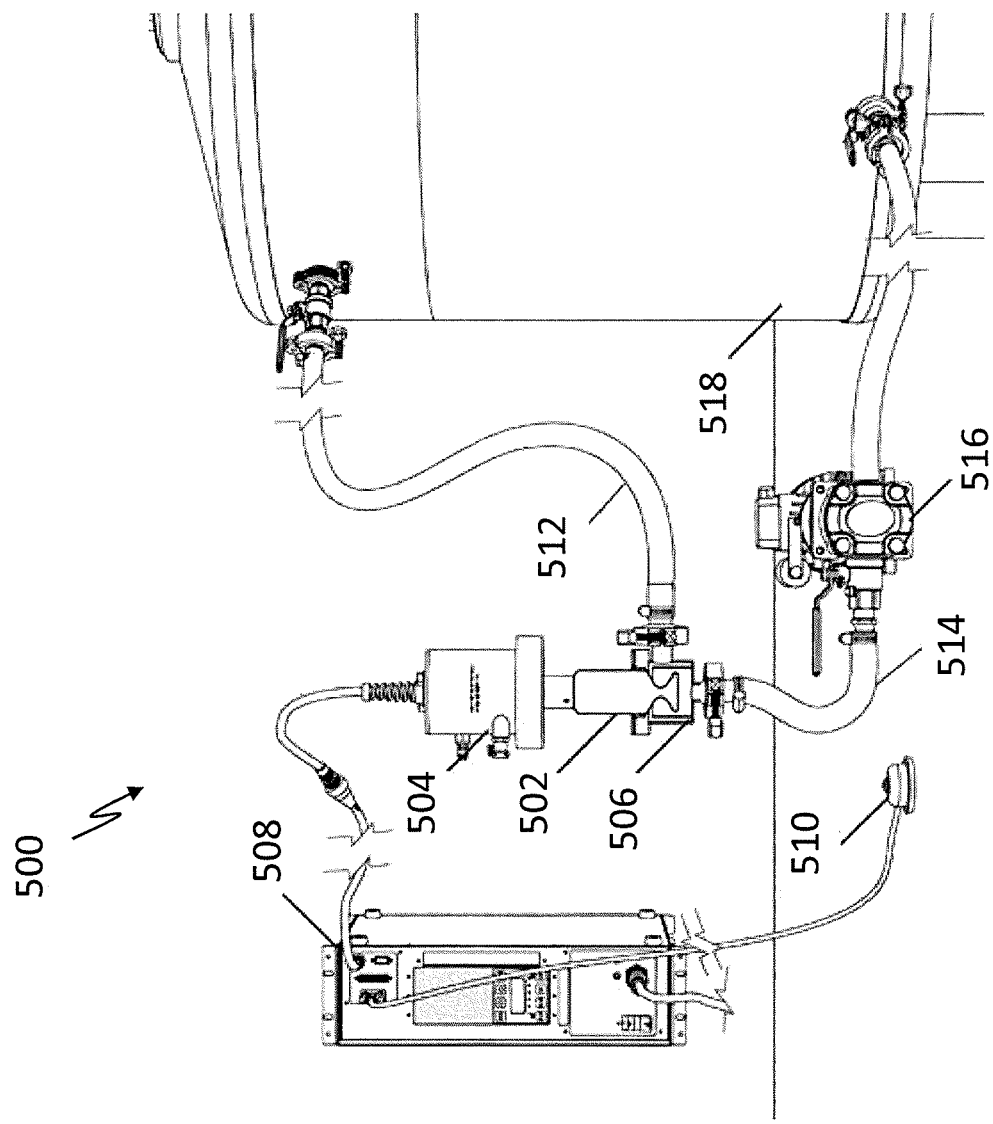
FIG. 8 is a schematic of an ultrasonic horn in combination with a flow-through reactor chamber (flow cell) according to the present invention.

There is seen in FIG. 8, a flow-through reactor system 500 having an ultrasonic horn 502 (which may be any of horn 100, horn 200, or horn 300 of the present invention) coupled to a transducer 504. The output surface of horn 502 is positioned in a flow-through reactor chamber 506 that holds a working liquid to be processed using ultrasonic horn 502. A generator 508 is used to drive transducer 504 in response to user activation via a remote switch 510. As is known in the art, flow-through reactor chamber 506 is enclosed and has an intake line 514 for receiving a liquid to be processed from a storage tank 518, such as via a pump 516, and an outlet line 512 for removing processed liquid and returning it to storage tank 518. Flow could also be reversed through flow-through reactor chamber 506 if desired.

In all of the embodiments described above, the entrance cylindrical section may be omitted or replaced by a variable-diameter section (increasing-diameter, decreasing-diameter, or more complex combinations thereof), which may be connected to or smoothly transition into the reducing-diameter section.

In all of the embodiments, the flange depicted in the figures is an optional feature that may be incorporated for use in sealing the horn into a reactor chamber (also referred to as a flow cell) and does not serve any purpose for the ultrasonic characteristics of the section itself. Alternatively, the flange may be placed on another section from that shown or omitted.

What is claimed is:

1. An ultrasonic horn, comprising:
    a first section having a first length that reduces in diameter over all of the first length from a first diameter to a second diameter; and
    a second section having a second length that increases in diameter over all of the second length of the second section from a third diameter to a fourth diameter; and
    a third section positioned between the first section and the second section and having at least a portion with the second diameter and at least a portion with the third diameter; and
    wherein an ultrasonic wave provided at an input surface will experience a gain in amplitude at an output surface;
    wherein the second section forms the output surface and the first section is coupled to a fourth section forming the input surface; and
    wherein the ultrasonic horn contains no more than two sections that are cylindrical.

2. The ultrasonic horn of claim 1, wherein the ultrasonic horn is positioned in a fixed-volume container for batch processing of a liquid that is also positioned within the fixed-volume container.

3. The ultrasonic horn of claim 1, wherein the ultrasonic horn is positioned in a reactor chamber through which a liquid may be passed for flow-through processing.

4. The ultrasonic horn of claim 1, further comprising a transducer coupled to the input surface and wherein the output surface is submerged in a liquid.

* * * * *